June 3, 1941. E. T. PARSONS ET AL 2,244,430
DOUGH-ROLL TRANSFER DEVICE FOR DOUGH HANDLING MACHINERY
Filed June 21, 1939 2 Sheets-Sheet 2
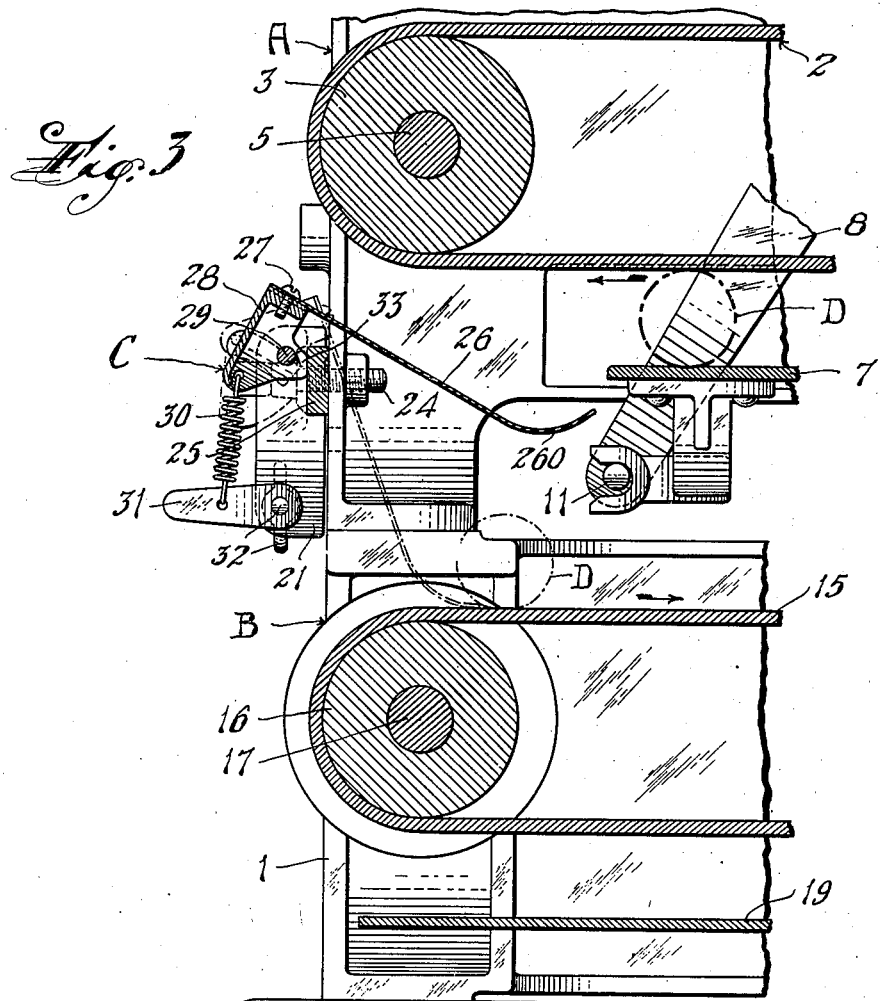
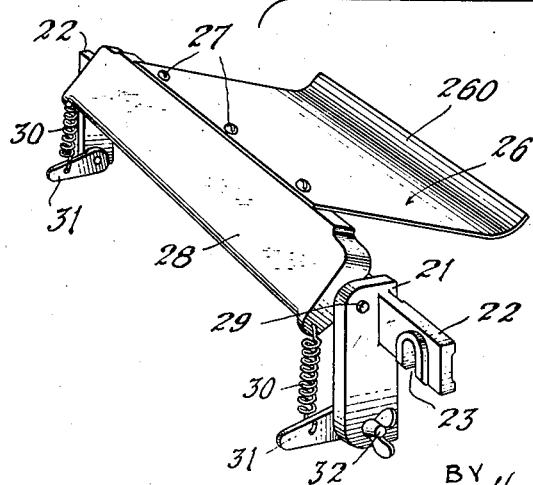
INVENTORS
Edward T. Parsons,
Hilon W. Sawyer and
Theodore P. Newitts
BY Harry B. Rook, ATTORNEY Patented June 3, 1941

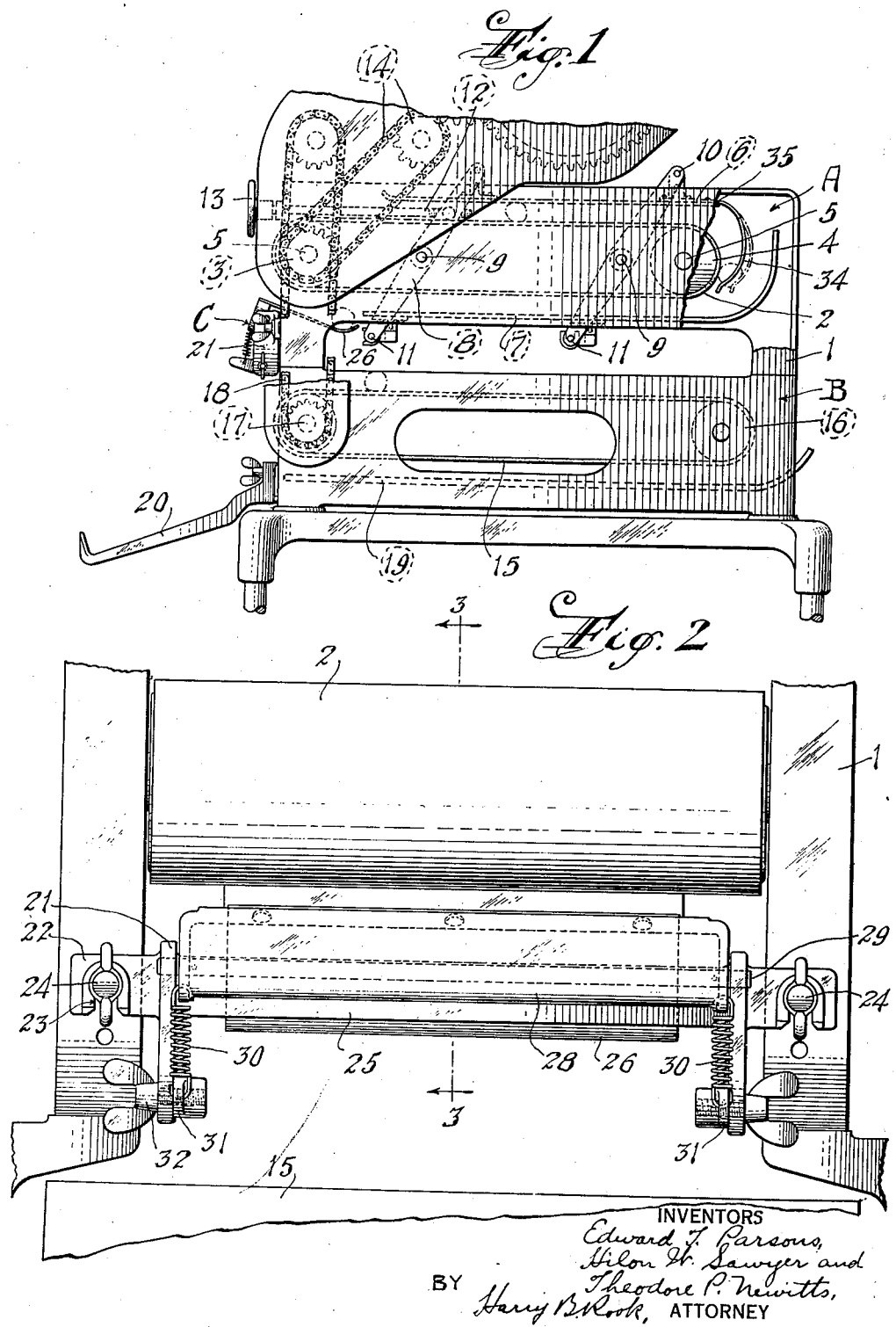

2,244,430

UNITED STATES PATENT OFFICE 2,244,430

DOUGH-ROLL TRANSFER DEVICE FOR DOUGH HANDLING MACHINERY

Edward T. Parsons, Upper Montclair, Hilon W. Sawyer, Nutley, and Theodore P. Newitts, Union, N. J., assignors to Thomson Machine Company, Belleville, N. J., a corporation of New Jersey Application June 21, 1939, Serial No. 280,228

4 Claims. (Cl. 198—27)

This invention relates in general to a device for transferring pieces of dough or the like from one position or location to another, or from one portion to another of dough handling machinery in such a manner as to insure accurate deposit of the pieces from one point to another and travel of the pieces in a desired path.

While the invention is adaptable for use in many different types of dough and bread working machinery, it is specifically designed to be utilized in connection with loaf moulders wherein pre-formed rolls of dough are operated upon successively by rolling, kneading or moulding mechanisms that are disposed in vertically superposed relation, whereby the transfer device embodying the invention will serve to transfer the roll of dough from the discharge end of one of said mechanisms to the receiving end of the next lower mechanism. In such machines it is important that the rolls of dough be transferred from one mechanism and deposited accurately in a certain predetermined relation to the next successive mechanism to insure against distortion of the roll in the second mentioned mechanism which might deleteriously affect the distribution of gases in the roll and the cellular structure thereof.

One object of the invention is to provide such a transfer device embodying novel and improved features of construction, whereby the movement of the dough from one mechanism to another shall be accurately controlled and the roll shall be deposited on the second mentioned mechanism at a predetermined point and in a predetermined relation to said second mentioned mechanism and the preceding rolls.

Another object is to provide such a transfer device wherein the transfer of the roll from one mechanism to the other shall be by gravitational action and novel and improved means shall be provided for controlling the speed and character of the movement of the roll under the action of gravity.

A further object is to provide a transfer device of the general character described which shall include means for receiving a roll of dough or the like from one mechanism and partially counterbalancing the weight of the roll of dough during the transfer of the latter to another mechanism, so that the movement of the dough from one mechanism to another under the influence of gravity shall be temporarily decelerated and accurately controlled to prevent sudden dropping and disarrangement of the roll in its transfer from one mechanism to another.

Other objects, advantages and results of the invention will appear from the following description when read in conjunction with the accompanying drawings in which Figure 1 is a fragmentary side elevation of a dough moulding machine and extender having a transfer device embodying our invention applied thereto, portions being broken away for clearness in illustration.

Figure 2 is a front elevation of the transfer device illustrated on an enlarged scale and mounted in operative position on the machine which is shown fragmentarily.

Figure 3 is a vertical longitudinal sectional view on the line 3—3 of Figure 2, and Figure 4 is a detached perspective view of the transfer device.

For the purpose of illustrating our invention, we have shown it in conjunction with a known type of dough working machine which includes a loaf moulding mechanism A disposed in vertically superposed relation to a loaf extending mechanism B. Our transfer device C is utilized to transfer rolls of dough from the moulding mechanism A to the extending mechanism B.

As shown, these mechanisms are mounted on a frame 1, and the moulding mechanism includes an endless belt 2 mounted on rollers 3 and 4 carried by shafts 5 that are journaled in the frame 1 so that the reaches of the conveyor are horizontally disposed.

Arranged in spaced and approximately parallel relation to the upper and lower reaches of the belt 2 are the respective compression plates 6 and 7 which are mounted on levers 8 that are pivotally mounted intermediate their ends at 9 on the frame and have their opposite ends pivotally connected at 10 and 11 to the respective plates 6 and 7. With this construction, by oscillation of the levers 8, the two plates 6 and 7 may be simultaneously moved toward and from the respective reaches of the conveyor. For oscillating the levers, a suitable adjusting screw 12 having a hand wheel 13 is provided.

The conveyor belt 2 is driven in any suitable manner in the direction of the arrows shown in Figure 3, as by chain and sprocket gearing 14 which is connected to suitable driving mechanism for the machine. All of the structure so far described is known, and is in general disclosed in Reissue Patent No. 18,545 dated July 26, 1932.

The loaf extending mechanism B includes an endless belt 15 mounted on rollers 16 that are journaled on shafts 17 in the frame of the machine so that the reaches of the belt 15 are approximately parallel to the reaches of the belt 2. The conveyor belt 15 is driven in any suitable manner as by a chain and sprocket connection 18 with the shaft 5 of the loaf moulding mechanism.

In operation of the machine so far described, a roll of dough shown by dot and dash lines D is formed by suitable mechanism such as that shown in Patent No. 1,542,832 dated June 23, 1935, wherein a lump of dough is first formed into a sheet which is then curled and rolled spirally into an approximately cylindrical roll. This roll is deposited on the upper reach of the conveyor 2 and moved beneath the upper compression plate 6 so that the roll is moulded and kneaded between the conveyor and the compression plate. The roll then drops by action of gravity from the upper reach of the conveyor 2 onto the compression plate 7 and is rolled between that plate and the lower reach of the conveyer in the direction of the arrows shown in Figure 3. Thereafter the roll is dropped by gravitational action to the upper reach of the extender conveyor 15, then dropped onto a compression plate 19 and rolled between the lower reach of the extender conveyor 15 and the compression plate 19 so that the roll is elongated or extended. The finished roll is then deposited upon a discharge tray 20.

Our transfer device C is mounted on the front of the frame 1 between the moulding and extending conveyors 2 and 15, and comprises a frame that includes end pieces 21 each of which has an arm 22 formed with a notch 23 to hang on a wing bolt 24 which is screwed into the frame 1. The end pieces are connected, preferably integrally, by a cross or tie bar 25 so that the frame may be handled as a unit. A transfer plate 26, preferably formed of thin sheet metal, has one end preferably separably secured as by screws 27 to a rocker bar 28 that is pivoted by pins 29 on the respective end pieces 21 of the frame, so that when the device is mounted on the frame 1 of the machine, the rocker 28 may swing about a horizontal axis to move the transfer plate 26 vertically. The rocker bar 28 and transfer plate 26 are normally influenced upwardly by tension springs 30 each of which has one end connected to one end of the rocker bar and the other end connected to an arm 31 that is pivotally adjustably mounted by a wing bolt 32 to one of the end pieces 21. By swinging the arms 31 about the wing bolts, the tension of the springs 30 may be adjusted, and by tightening the wing bolts, the arms may be frictionally held in adjusted positions.

The transfer device is mounted on the frame 1 of the machine in such a way that the free edge of the transfer plate 26 is disposed adjacent and slightly below the discharge end of the lower compression plate 7 of the moulding mechanism A so as to receive a roll of dough D by action of gravity from said compression plate. Preferably the free edge of the transfer plate is curved upwardly as at 260 to provide a trough-like receptacle for the roll of dough, the trough being disposed transversely of the direction of movement of the conveyor. The tension of the springs 30 is initially set to partially counterbalance the weight of a roll of dough C.

In operation, as a roll of dough D drops from the compression plate 7 onto the transfer plate 26, the transfer plate slowly swings downwardly under the weight of the roll until the free edge of the transfer plate approximately touches the upper reach of the extender conveyor 15, as shown by dot and dash lines in Figure 3. Thereupon, the roll of dough rolls off the transfer plate onto the upper reach of the conveyor 15 and is carried away by the conveyor. It will be noted that this action will be slow and controlled so that the drop of the roll from the compression plate 7 is decelerated and the roll is oriented by action of gravity upon the roll and accurately deposited on the conveyor 15 with the axis of the roll perpendicular to the direction of travel of the conveyor belt. In other words, should a roll of dough enter the trough on the plate 26 with its axis oblique to the direction of travel of the conveyor belts, the roll will be turned on the plate and slide into the trough with its axis perpendicular to the direction of travel of the conveyor belts, after which the roll will be deposited accurately on the conveyor 15. This ensures that the rolls shall be arranged on the lower conveyor 15 with their axes parallel to each other and with the rolls properly spaced apart; ensures against tumbling and dislocation of the roll in its transfer from the moulding mechanism to the extending mechanism such as would occur without the transfer device; and eliminates the possibility of one roll falling crosswise upon another roll on the lower conveyor 15.

After the roll has been discharged from the transfer plate, the springs swing the transfer plate upwardly to its initial position, movement of the transfer plate under the influence of the springs in this direction being limited by engagement of stop lugs 33 on the rocker bar 28 with the cross bar 25.

It is desirable to provide means for controlling the dropping of the dough roll from the upper reach of the conveyor 2 to the lower compression plate 7, and for this purpose we may use a spring plate 34 having one end secured at 35 to the discharge end of the upper compression plate 6 and its other end curved and normally spaced from the roller 2 a distance somewhat less than the diameter of the roll of dough. In operation, the roll passes under the plate 34 which yields outwardly as shown in dot and dash lines and presses the roll against the conveyor so as to prevent a sudden and uncontrolled drop of the roll onto the lower compression plate 7. This insures that the roll shall be deposited on the compression plate 7 with its axis perpendicular to the direction of travel of the lower reach of the conveyor, and thereby avoids possibility of turning or twisting of the roll diagonally of the conveyor and consequent distortion of the roll and damage to the cellular structure thereof.

If desired, a transfer device like the device C can be utilized in place of the spring plate 34.

While we have shown and described our invention as embodied in certain details of structure, and used in conjunction with a certain type of dough handling machine, it should be understood that this is primarily for illustrating the principles of the invention. The transfer device may be used in connection with other types of dough handling machines or conveyor mechanisms, and may be embodied in different details of structure without departing from the spirit or scope of the invention.

Having thus described our invention, what we claim is:

1. In a dough working machine including two dough working mechanisms for operating upon a substantially cylindrical piece of dough, each including cooperating parts to roll said piece of dough between them, the discharge end of one of said mechanism being vertically superposed to the receiving end of the other, a transfer device including a receptacle pivoted on a horizontal axis to swing upwardly and downwardly between said discharge end and said receiving end and disposed transversely of the direction of movement of said piece of dough to take in its upper position said piece of dough from said discharge end of the upper mechanism, orient said piece with its axis perpendicular to the direction of travel of the piece through the lower mechanism, and deposit said piece on said receiving end of the lower mechanism when said receptacle is in its lower position.

2. In a dough working machine including two dough working mechanisms for operating upon a roll of dough, each mechanism having a conveyor the discharge end of one of which is vertically superposed to the receiving end of the other, a transfer device including a plate pivotally mounted and swingable upwardly and downwardly between said discharge end and said receiving end to take in its upper position said roll of dough from said discharge end of the upper conveyor and deposit said roll upon said receiving end of the lower conveyor when said part is in its lower position, said plate being curved to form a trough disposed transversely of the direction of movement of said conveyor for automatically orienting said roll by action of gravity thereon with its axis perpendicular to the direction of travel of the lower conveyor during swinging of said plate from its upper position to its lower position.

3. In a machine including two mechanisms for handling an approximately cylindrical piece, the discharge end of one of which is disposed above the receiving end of the other, the upper mechanism including cooperating parts to roll between them said piece about its axis, a transfer device including a plate pivotally mounted at one end to permit the opposite end to swing vertically between said discharge end of the upper mechanism and said receiving end of the lower mechanism to take in its upper position said piece from said discharge end and to deposit said piece upon said receiving end when said plate is in its lower position, the swinging end of said plate being curved upwardly to form a trough disposed transversely of the direction of movement of said piece from said discharge end so that said piece will roll by gravity into said trough and be oriented during swinging of said plate from its upper position to its lower position.

4. The machine according to claim 3, with the addition of means for retarding swinging of said plate downwardly, and wherein said plate in its lower position is inclined with respect to said receiving end of the lower mechanism to cause said piece to roll by action of gravity from said trough onto said receiving end.

EDWARD T. PARSONS.
H. W. SAWYER.
THEODORE P. NEWITTS.